(No Model.) 3 Sheets—Sheet 2.

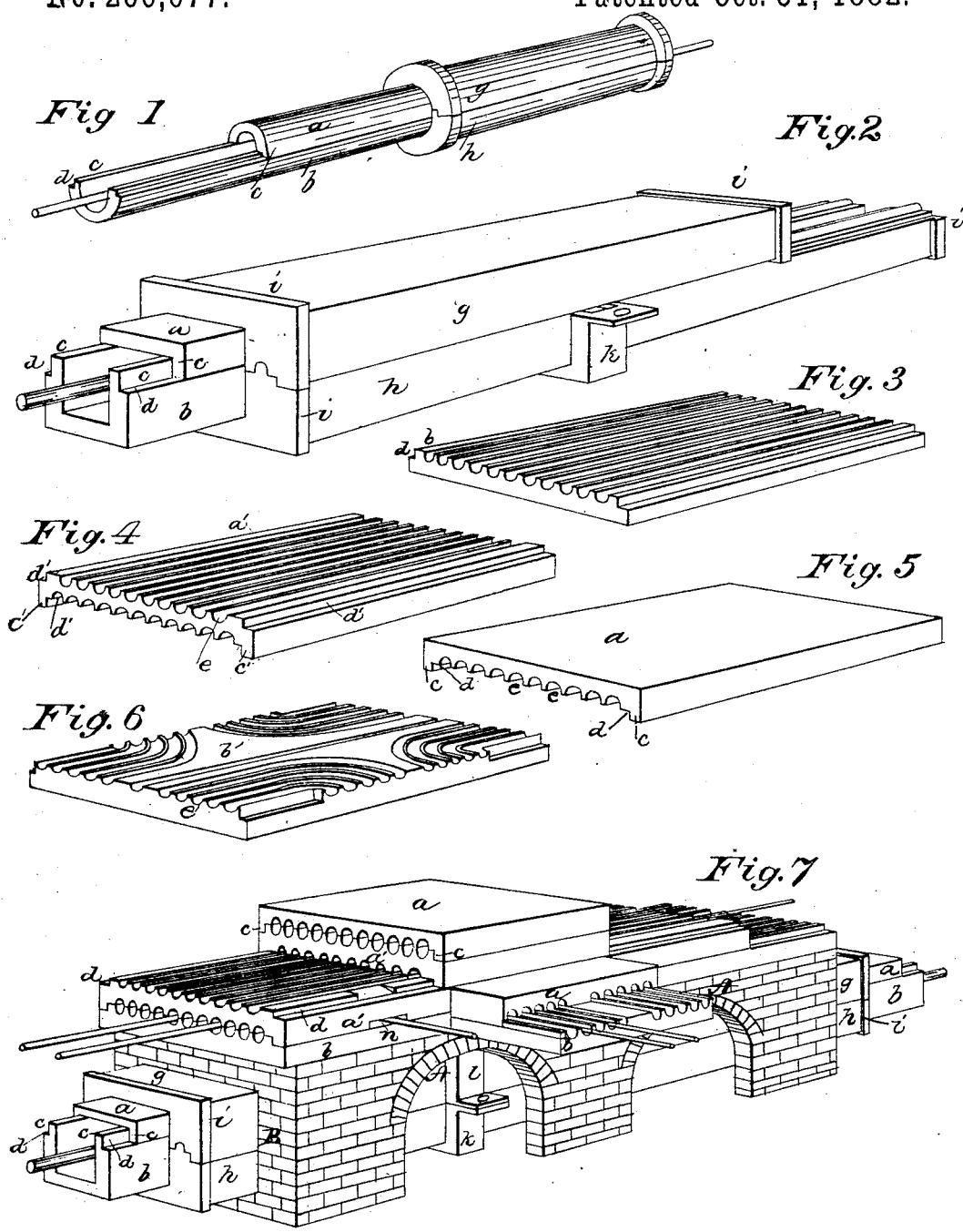

R. H. CORBETT.
CONDUIT FOR ELECTRIC LINES.

No. 266,677. Patented Oct. 31, 1882.

Witnesses:
A. J. Dunlevan
Albert E. DeMott

Inventor.
Robert H. Corbett

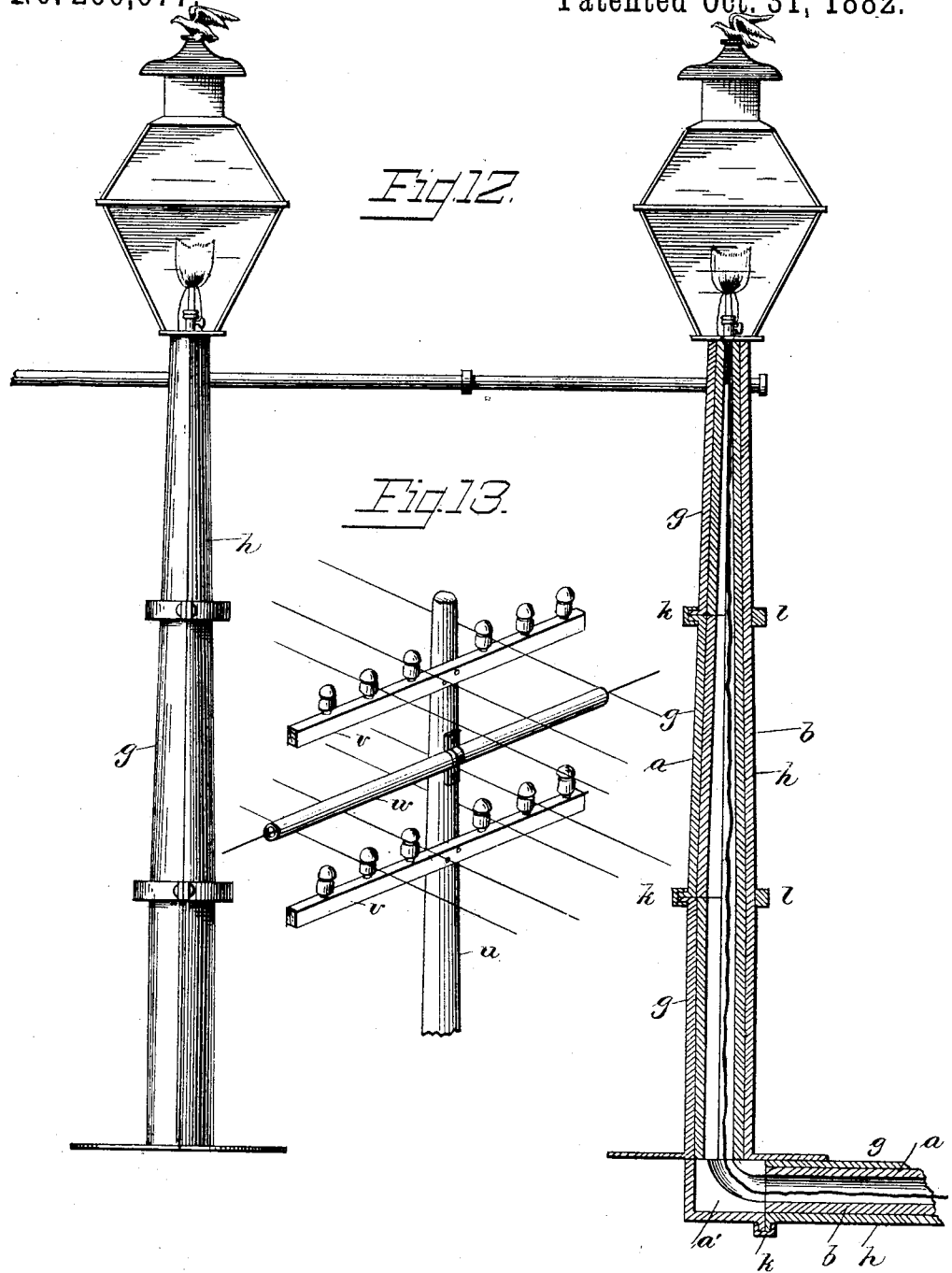

UNITED STATES PATENT OFFICE.

ROBERT H. CORBETT, OF NEW YORK, N. Y.

CONDUIT FOR ELECTRIC LINES.

SPECIFICATION forming part of Letters Patent No. 266,677, dated October 31, 1882.

Application filed December 27, 1881. (No model.)

*To all whom it may concern:*

Be it known that I, ROBERT H. CORBETT, a citizen of the United States, residing in the city of New York, in the county and State of New York, have invented certain new and useful Improvements in Conduits for Electric Lines and for other Kindred Purposes, of which the following is a full, clear, and exact description, reference being had to the accompanying drawings, forming part hereof.

This invention consists in pieces or sections of material grooved and provided with longitudinal edge flanges or laps and rabbets or grooves, and adapted to be combined to form pipes, tubes, or posts, in the manner and by means substantially as hereinafter specifically set forth and claimed. The pipes and tubes or conduits thus formed or made are intended for various purposes, as drains, sewers, and for deadening sound in buildings; but the object is more particularly to make or form a pipe or tube, or a combination or series of pipes or tubes, which may be used for laying insulating and incasing wires, wire cables, and tubes, to be laid under ground and under sidewalks, streets, or roads, and through and under houses and buildings, which wires, wire cables, and tubes may be used for telegraph and telephone purposes, or for conducting, transmitting, and conveying electricity for lighting, power, or other uses. These tubes may also be employed for the purpose of transmitting dispatches or messages pneumatically.

Figure 8:
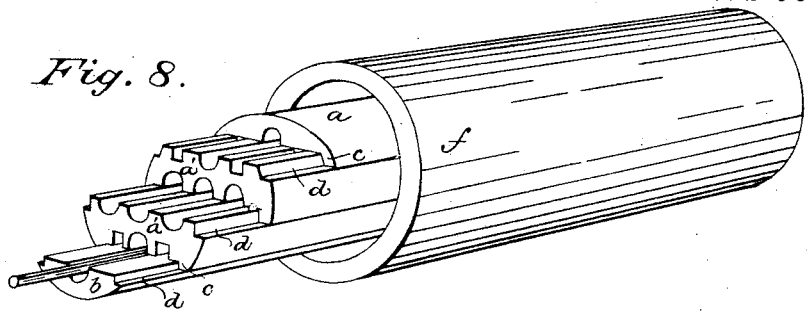
Figure 9:
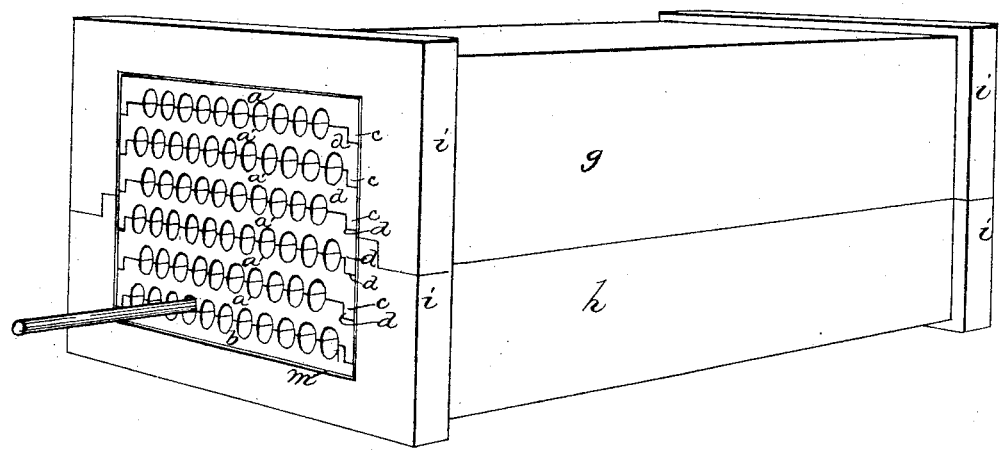
Figure 10:
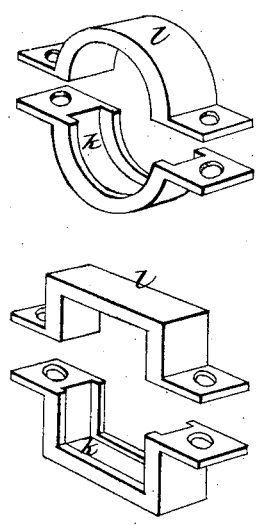
Figure 11:
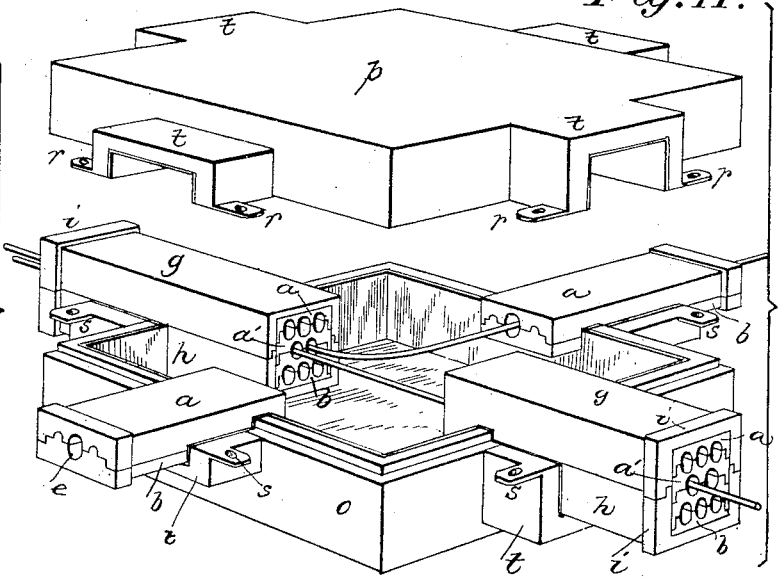

In the accompanying drawings, illustrating my invention, in the several figures of which like parts are similarly designated, Figure 1 shows in perspective a piece of round metal pipe made from two longitudinal pieces, with a longitudinally-sectional non-conducting tube within it and a wire within the said non-conducting tube. Fig. 2 shows in perspective two lengths of square incasing-pipe formed from longitudinal pieces of iron held together by grooves and flanges, and a square pipe arranged in said casing, formed from pieces of glass, the cavity in said glass pipe being all in the under piece, with a wire projecting from the end thereof. Fig. 3 shows in perspective the bottom piece of a series of half-tubes. Fig. 4 shows in perspective the middle piece, having a series of half-tubes or grooves on both sides, made to register with the half-tubes or grooves of the bottom and top pieces or sections. Fig. 5 shows in perspective a top piece with grooves or half-tubes on its under side, adapted to register with the half-tubes or grooves on the top of the middle piece. Fig. 6 shows in perspective the bottom piece of a corner or angle section with curved or bent half-tubes or grooves, which may be used at places where it is desired to diverge from a straight line to a curve or angle. Fig. 7 shows in perspective the devices illustrated in Fig. 2 as laid under an arch and through the piers thereof, and also the parts shown in Figs. 3, 4, 5, and 6 as laid on an arch, with additional center pieces or sections and wires extending from the ends of the conduits, and also shows the openings in the sides of the pipes or tubes, giving access to the wire or wire cables laid in the pipe or tube. Fig. 8 shows in perspective a piece of ordinary or common metal pipe with longitudinal pieces of glass pipe incased therein, which latter form conduits for insulating-wires. Fig. 9 shows in perspective a square pipe as laid, lined with glass, and glass or equivalent non-conducting pipes arranged in it, with wires in the latter pipes. Fig. 10 shows in perspective two forms of clamps or couplings used to hold the outside pipes or tubes together, these forms differing only in shape to correspond with the shape of the pipes. Fig. 11 shows in perspective, with the upper section or half loosened and raised, a box or chamber in which wires, cables, and tubes can be connected and diverted from a straight line to a curve or angle, which said box or chamber may be lined with glass or any other non-conducting substance. Fig. 12 is a view in elevation of my plan of electric gas-lighting or supporting an electric-line carrier on lamp-posts. Fig. 13 is a detail of a telegraph-pole, showing the attachment thereto of the ordinary telegraph-wire, and of my pipe for conducting an electric-light or other wire out of possible interference with the telegraph-wires.

The pieces or sections *a b* to form pipes, tubes or posts may be made of glass, stone, stoneware, terra-cotta, clay, cement, plaster, wood, or prepared wood, also of iron, zinc, copper, or brass, or other material which of itself is or may be rendered non-conducting, as by galvanizing or vitrifaction or lining. These sections $a\ b$ are provided with longitudinal flanges or laps $c$, which enter grooves or rabbets $d$ therein, so as to keep the parts together. Said sections may be semicircular, so as to form round tubes, as in Fig. 1; or the tubular part may be all in the lower half and it be rectangular, with the upper part formed substantially as a lid or cover, as in Fig. 2; or if a number of wires are to be laid the half-tubes may be made in one or both surfaces of flat slabs, and these slabs or sections provided with the flanges, as shown in Figs. 3, 4, and 5. I prefer to make sections or slabs $a'$, having flanges $c'$ and grooves $d'$, and in the upper and lower faces of which sections I make half-tubes or grooves $e$. These sections may be duplicated to any desired extent, and are adapted to fit into one another, so as to cause their opposite half-tubes or grooves to register to form tubular cavities between the sections, which are useful to receive electric wires for pneumatic transmission and the like. I provide a base, $b$, Fig. 3, for the sections $a'$, upon which they are built up, and also employ a flanged cap, $a$, Fig. 5, both base and cap having half-tubes or grooves to register with the half-tubes or grooves of the adjacent faces of the sections $a'$ to form whole tubes. (See Figs. 7, 8, 9 and 11.) In laying a line of any considerable length of these sections I prefer to have them break joints, so as to cause them to build up more compactly. (See Figs. 7 and 8.) Fig. 6 illustrates one-half of my tubular sections $b'$ constructed for use in making bends in the line. When these pipes or tubes are laid with the wires or wire cables in the tubes the surrounding space may be filled with glass, cement, rosin, tar, pitch, paraffine, plaster, clay, sand, beeswax, lead, or other suitable material, to thereby make the pipes or tubes, with the wires and wire cables in them, water-tight and impervious to dampness. The pipes or tubes so formed or made may be incased in ordinary or common pipes or tubes, $f$, Fig. 8, or in pipes or tubes formed or made from two or more longitudinal pieces, $g\ h$, flanged and grooved, as described of the other pipes or sections, or incased in iron, brick, or cement. These pipes are also laid with break-joints, and said pipes are provided with end flanges, $i$, with which engage the lipped half $k$ of a coupling, Fig. 10, secured about the pipe by the other half, $l$, of said coupling bolted thereupon. These pipes, with their inclosed glass pipes or sections and wires, are to be laid underground, overground, upon or in connection with lamp-posts, telegraph-posts, or may be laid and supported on arches A or piers B of brick or masonry, or laid and supported under the arch and through the piers of the arch, as shown in Fig. 7. An arch in front of each building would give access to the sewers, water and gas pipes, without the necessity of disturbing the pipes, tubes, wires, and wire cables.

Fig. 7 is employed in this case in order to show the mode of supporting the particular conduits herein set forth; but the principle embodied in said figure and its application to the support of conduits generally will form the subject-matter of a future application.

In Fig. 9 the external casing or iron pipe is provided with a vitrified lining, $m$, so as to most fully insure the insulation of the wires.

In Fig. 10 the lower member of the coupling is shown lipped and the upper member plain, the object being to admit of the application of a coupling to a flange on one side the pipe when there is none on the opposite side, which is the case when the pipes are laid to break joints. In some instances it may not be unadvisable to apply the end flanges to the sections $a\ b$ and connect them by couplings, if desired. (See Fig. 11.)

In Fig. 11 I show the details of a box to be used where there are many crossing lines, into which box a workman can get in order to arrange the wires, &c.

In Fig. 7 I have shown an opening, $n$, in the side of the sections $a'$, for use in reaching from the outside the outermost wire of a line. The casing not only incloses the wires, but it strengthens the line, prevents danger from frost, fire, and contact, and permits the laying of electric-light lines with perfect immunity from danger of accidental contact therewith.

In Fig. 11 I have shown a non-conducting casing or box, forming a chamber in which crossing or diverted lines may meet and be conducted in the proper direction. This casing is composed of a metal body, $o$, and a detachable cover, $p$, adapted to be closely connected, so as to be water-tight, by means of rabbeted edges, as shown. The parts $o$ and $p$ are lined with glass, as glass plates, or otherwise rendered non-conducting as to electricity. Lugs $r\ s$ are provided on the cover and body, which take the place of the clamps for securing the cover to the body. The body is provided with four (more or less) projecting receptacles, $t$, for the support of the pipes, as shown. This box being non-conducting, the electric wires may be openly therein transferred from one line of pipe to another to change their directions. By removing the lid or cover access is gained to the box for making these changes.

Electric-light lines and such like heavily-charged wires may be conducted across dangerous or exposed places by incasing them in my pipes. For instance, such lines, when supported upon the poles of other lines, have been found to seriously interfere with such other lines. Now, if a section of my casing and insulator be used on the poles, this danger is overcome. Such a construction is shown in Fig. 13, $u$ being the telegraph-pole, $v$ the usual bars thereon for telegraph-lines, and $w$ a section of my insulating-pipe for an electric-light or other heavily-charged line.

Lamp-posts for electric lights or ordinary electric gas-lighting may be made in accordance with this invention, and the wires arranged underground or overground, as desired. If overground, the lamp-posts on each block may support my casing, and at a street-crossing the wires will have to be elevated or else run underground across the same, being taken down through one lamp-post and across and up and out of the opposite post on the next block, as seen in Fig. 12. The lamp-post is in this case preferably sectional and substantially of the construction shown in Fig. 1. No particular connection of the wire with the burner is herein shown, as that is not of this present invention. If the lines for electric lamps or gas-lighting are to be run underground, the connections with the lamp-posts will be made by bend sections $b'$, and the lamp-posts will be such as described.

What I claim as my invention is—

1. Pipes, tubes, or posts for conducting and supporting electric wires, and for other purposes, composed of longitudinal non-conducting pieces or sections laid with break-joints, and provided with longitudinal edge flanges or laps, combined with a longitudinally-divided sectional external metallic casing laid with break-joints, and also having longitudinal edge flanges or laps, and end flanges, and divided clamps or couplings applied to such external casing partly on its end flange and partly on the body of the lapping section, to hold the whole together, substantially as shown and described.

2. The non-conducting grooved sections $a$ $a'$ $b$, provided with flanges $c$ $c'$ and grooves $d$ $d'$, substantially as shown, and for the purpose described.

3. The non-conducting or insulating section $a'$, grooved on opposite faces, and provided with side or edge flanges or lips and rabbets, combined with superposed and underlying sections having in their adjacent faces grooves to register with the grooves of the section $a'$ to form tubular cavities, and provided with rabbets and flanges to engage the flanges and rabbets of said section $a'$, substantially as and for the purpose described.

4. The flanged and rabbeted section $b'$, having its grooves or half-tubes curved or diverted from a straight line, as shown and described, adapted to be combined with similar sections having grooves or half-tubes, and flanges and rabbets, to form with the section $b'$ tubes, and with similarly grooved flanged and rabbeted sections, forming straight tubes, to connect with the diverting tubes to conduct a line in the desired direction, substantially as described.

5. The combination, with the wire-receiving sections, of the divided flanged and rabbeted casing-sections $g$ $h$, the end flanges, $i$, on said casing-sections, and the clamp members $k$ $l$, substantially as shown and described.

6. The combination, substantially as shown and described, of the grooved sections $a$ $b$, provided with flanges $c$ and rabbets $d$ along their longitudinal edges, the casing-sections $g$ $h$, having end flanges, $i$, and the clamps $k$ $l$, to engage the flange $i$ of one section in binding the parts together.

7. The box of non-conducting material provided with tubes for receiving the ends of longitudinally-divided electrical conduits, such box and tubes being divided into two equal parts, provided with rabbeted edges, as shown, and perforated lugs, in combination with such longitudinally-divided conduits, substantially as and for the purpose set forth.

8. The longitudinally-divided sectional external casing, laid with break-joints and having longitudinal edge flanges or laps and end flanges, combined with divided clamps or couplings applied to such external casing partly on its end flanges and partly on the body of the lapping sections, to hold the whole together, substantially as set forth.

ROBERT H. CORBETT.

In presence of—
HENRY E. KLUGH,
WM. H. OSBORN.